Figure 1:
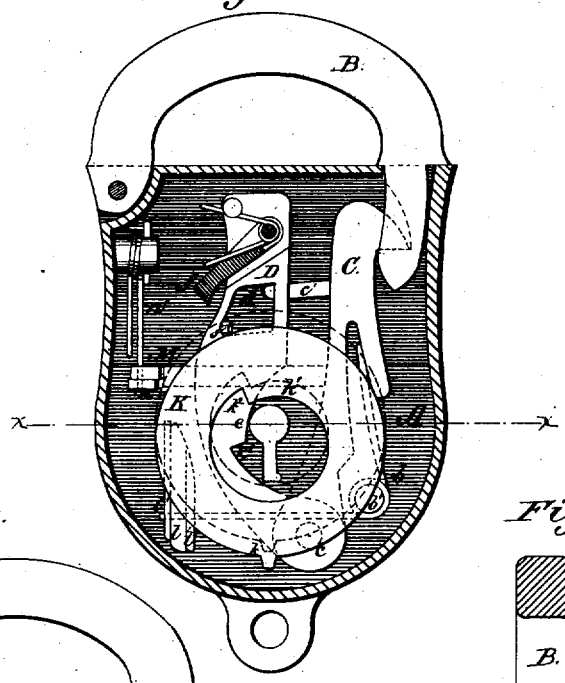

2 Sheets—Sheet 1

E. A. COOPER,

Assignor to M. C. OGDEN, said OGDEN assignor to EAGLE LOCK CO.

Indicator Lock.

No. 9,567. Reissued Feb. 15, 1881.

WITNESSES:

W. W. Hollingsworth

Edw. H. Byrn.

INVENTOR:

E. A. Cooper

BY Munn & Co

ATTORNEYS.

N. PETERS, PHOTO-LITHOGRAPHER, WASHINGTON, D. C.

2 Sheets—Sheet 2.

E. A. COOPER,

Assignor to M. C. OGDEN, said OGDEN assignor to EAGLE LOCK CO.

Indicator Lock.

No. 9,567. Reissued Feb. 15, 1881.

WITNESSES:

W. W. Hollingsworth

Edw. W. Byrn

INVENTOR:

E. A. Cooper

BY

ATTORNEYS.

N. PETERS, PHOTO-LITHOGRAPHER, WASHINGTON, D. C.

UNITED STATES PATENT OFFICE.

EDWARD A. COOPER, OF BUFFALO, ASSIGNOR TO MORTIMER C. OGDEN, OF BROOKLYN, NEW YORK; SAID OGDEN ASSIGNOR TO EAGLE LOCK COMPANY, OF TERRYVILLE, CONNECTICUT.

INDICATOR-LOCK.

SPECIFICATION forming part of Reissued Letters Patent No. 9,567, dated February 15, 1881.

Original No. 137,181, dated March 25, 1873. Application for reissue filed December 14, 1880.

*To all whom it may concern:*

Be it known that I, EDWARD A. COOPER, of Buffalo, in the county of Erie and State of New York, have invented a new and useful Improvement in Indicator-Locks; and I do hereby declare that the following is a full, clear, and exact description of the same.

My invention relates to that class of locks in which a numbered wheel or wheels are connected with the mechanism of the lock so as to be moved one degree each time the lock is opened, and indicate the number of times the lock has been opened by exposing a different number or character through an opening in the lock-case. A sealed stop has heretofore been employed in such locks to arrest the movement of the indicator-wheel when it has completed one revolution or any desired part of a revolution.

My invention consists, mainly, in the following general features: First, in the combination of an indicator-wheel, arranged concentrically about the key-pin, with a detent or locking device for holding the indicator-wheel, which locking device engages the indicator-wheel by a movement outward from the center; second, in the combination, with the indicator-wheel, of an actuating mechanism for the progressive forward movement of the indicator-wheel, and a detent adapted to engage with the key-bit to prevent the back movement of the key; third, in the peculiar construction and arrangement of the sliding detent or locking mechanism for the indicator-wheel, whereby it is made to lock the indicator-wheel and also resist the back movement of the key; fourth, in the combination, with the hasp and locking-dog, of a vibrating arm, coupled to the locking-dog by a link in such manner that the dog may be moved by the hasp without affecting the vibrating arm, while the vibration of the latter, by the action of the key upon its cam-face, will cause the dog to be withdrawn, as will be hereinafter more fully set forth; fifth, in the combination, with the locking-dog and tumbler-arm provided with a spring-pawl, of an indicator-wheel, sliding detent-plate, and way-key, which disengages the detent-plate from the indicator-wheel, and moves the latter, through the medium of the tumbler-arm and pawl attached thereto, at the same time that the hasp is released; sixth, in the combination, with the indicator-wheel, of a spring-lever arranged on the front-plate, which engages in a notch in the wheel, and locks the same after it has completed a revolution or any required part of a revolution; seventh, in the the combination, with the indicator-wheel, locking-lever, tumbler-arm, and detent-plate, of a through-key for unlocking the lock when the indicator-wheel has been arrested by the locking-lever.

Figure 2:
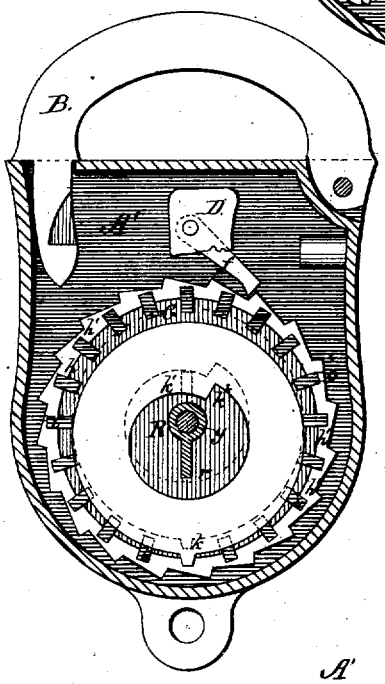
Figure 3:
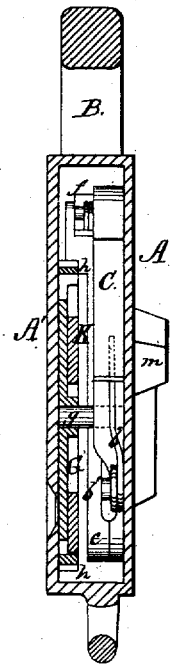
Figure 5:
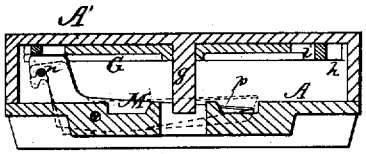
Figure 4:
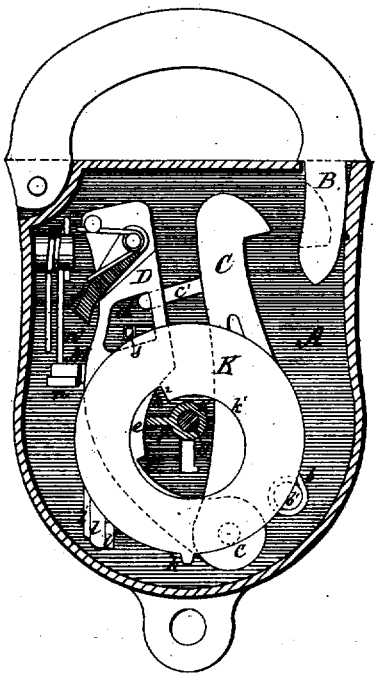
Figure 6:
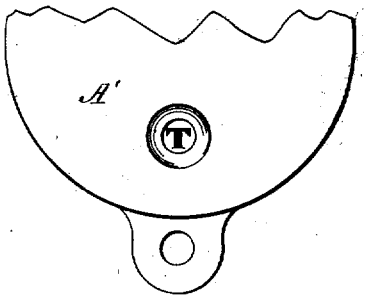
Figure 7:
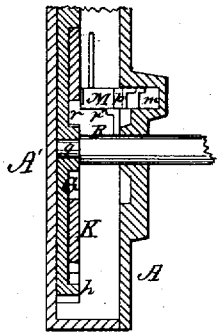
Figure 9:
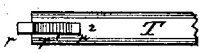
Figure 8:
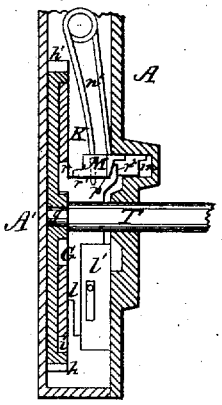

In the accompanying drawings, Figure 1 is a view of my improved lock with the rear plate and indicator-wheel removed. Fig. 2 is a view of the rear plate and indicator-wheel. Fig. 3 is a vertical section of the lock. Fig. 4 is a view, showing the locking mechanism opened so as to release the hasp. Fig. 5 is a horizontal section in line *x x*, Fig. 1, looking upward. Fig. 6 is a view of the lower portion of the rear plate of the lock-case. Fig. 7 is a fragmentary vertical section, showing the operation of the ordinary key. Fig. 8 is a similar view, showing the operation of the key by which the locking-lever of the indicator-wheel is released. Fig. 9 is a plan view of the key employed for releasing said locking-lever.

A represents the front plate of the lock-case, and A′ the rear plate thereof.

B is the hasp, and C the locking catch or dog, turning on a pin, *c*, secured to the front plate, A, and held against the hasp by a spring, *b*.

D is an arm, also turning on the pivot *c*, and arranged on the plate A, back of the dog C, and on the opposite side of the key-hole. It is connected to the dog C by a link or hook, *c′*, secured to the latter and projecting through an opening, *d*, in the arm D, and provided with a head that prevents its withdrawal, while the link slides freely in the opening *d*, so as to allow the catch to move to and from the arm D independent of the latter.

*e* is a cam or curved surface, arranged on the arm D next to the key-hole for the engagement of the key therewith, and terminating in a notch, *e′*.

*f* is a spring-pawl, secured to the upper end of the arm D, for operating the indicator-wheel.

G is the indicator-wheel, arranged on the rear plate, A′, and turning on the key-pin *g* concentrically therewith. The rim *h* of the indicator-wheel is made somewhat thicker than the main body or disk thereof, and provided in its periphery with a suitable number of ratchets, *h′*, while a corresponding number of radial notches, *i*, are arranged in its inner surface. The indicator-wheel G is provided on its surface adjacent to the rear plate, A, with a series of concentric numbers or letters, corresponding in number and position with the ratchets *h′*, one of said numbers or letters being exposed to view through an opening in the plate A′ when the mechanism is locked, as shown in Fig. 6.

K is the circular detent-plate, arranged on the main body of the indicator-wheel and provided with a projecting tooth, *k*, engaging in the lowest notch *i* in the rim of the indicator-wheel. The detent-plate K is made smaller in diameter than the rim *h*, so as to leave sufficient play at the top to enable it to be raised for disengaging the tooth *k* from the respective notch *i* with which it may be engaged. The inner portion of the plate K, around the arbor *g*, is cut out and formed above the key-hole with a cam, *k′*, terminating in a notch, $k^2$. The plate K is provided with an elongated lug or rib, *l*, sliding between two parallel guides, *l′*, secured to the front plate, A, as the disk is moved.

The spring *b*, by which the dog C is held in contact with the hasp, is wound around a pin, *b′*, one end of the spring engaging with the dog C, while the other end engages with the lug *l*, so as to press the detent-plate K against the lower portion of the rim *h* of the indicator-wheel. The guides *l′* are provided with a vertical slot to permit of the requisite movement of the spring *b* when the detent-tooth *k* is disengaged, as clearly shown in Fig. 8.

M is a horizontal lever, pivoted in a recess, *m*, arranged in the front plate, A, of the lock-case, as shown most clearly in Figs. 5, 7, and 8. The short arm of this lever is bent at right angles to the main body of the same and provided with a projecting ledge, *n*, held against the side of the rim *h* of the indicator-wheel by a suitable spring, *n′*. *o* is a notch, arranged in the side of the rim *h* in such manner that when the wheel G has completed a revolution the lever M engages with its ledge *n* in the notch *o*. The opposite end of the lever M is provided with a rib or flange, *p*, which projects slightly from the inner surface of the plate A while the lever M is engaged with the notch *o* of the indicator-wheel, and is depressed in releasing the wheel, as will presently be explained.

Operation: The padlock is locked by forcing the hasp against the inclined head of the catch C, which is pressed back toward the arm D until the parts are in the proper position to engage, when the spring *b* returns the catch to its normal and locked position. The ordinary key R used for opening the lock being inserted and turned, the projection *r* first engages with the cam *k′* of the plate K, raising the same against the spring *b*, so as to disengage the detent-tooth *k* from the indicator-wheel, as shown in Fig. 7 and by dotted lines in Fig. 2. By further turning the key its main portion *r′* engages with the cam *e* of the arm D, swinging the latter on its pivot, the dog C following this movement of the arm D, by reason of the connecting-link *c′*, while the pawl *f* turns the indicator-wheel. When the key is so far turned that its projection *r* coincides with the notch $k^2$ the plate K descends, by the reaction of the spring *b*, and rests with the tooth *k* against the inner side of the rim *h* until the indicator-wheel is turned far enough to bring the next notch, *i*, under the tooth *k*, when the latter engages therewith so as to lock the wheel in this position. During this movement of the key the dog C is disengaged from the hasp and held away from the same until the main portion *r′* reaches the notch *e′* in the arm D, when the latter and the dog C are released from the key and returned, by the spring *b*, to their former position, this backward movement of the arm D being limited by a stop, *s*, arranged on the plate A. After the tongue *r* of the key has passed into the notch $k^2$ of the plate K the reversal of the key is arrested, so that it can only be withdrawn by completing the revolution thereof, as above described. As this engagement of the key with the notch takes place before the hasp is released the lock cannot be opened without either partly turning the key and leaving it fast in the lock, or else by making a complete revolution of the key and moving the indicator-wheel. When the wheel G has completed one revolution the notch *o* in the rim thereof coincides with the ledge *n* of the horizontal lever M, which ledge engages in said notch, and, holding the indicator-wheel G in this position, prevents further movement of the arm D and dog C, and consequently the unlocking of the lock.

It is evident from the foregoing that the lock can be opened as many times as there are ratchets in the indicator-wheel; also, that by properly arranging the notch *o* the mechanism may be locked after the lock has been opened any desired number of times. Only the ordinary key R being in the hands of the employés along the road it is rendered impossible for them to open the lock after the locking-lever M has engaged with the notch *o*. Without such locking device the lock could be repeatedly opened until the indicator-wheel had completed an entire revolution, so as to expose the same number or character that was in view before the lock was interfered with, and thereby leave no indication that the lock had been thus opened.

T represents the key which is used for disengaging the locking-lever M from the notch *o* of the indicator-wheel. This key is formed similar to the key R, except that it is provided with an additional projection, $r^2$, beveled off at the inner side, as shown in Fig. 9. By turning this key in the lock the sharp edge of the beveled projection $r^2$ engages behind the rib or flange *p* of the locking-lever M, forcing that end of the latter away from the plate A, as shown by dotted lines in Fig. 5, whereby the opposite end of the lever is withdrawn from the notch *o* and the indicator-wheel released. The latter is now enabled to complete another revolution before it is locked again. The key T is placed in the hands of an authorized person stationed at each end of the road, and whose duty it is to examine the locks and reset the same for the return-trip.

The lock is made self-locking by means of the sliding link which connects the dog with the arm D, admitting of the spring-movement of the dog irrespective of the arm.

What I claim as my invention is—

1. In an indicator-lock, the combination of an indicator-wheel, arranged concentrically with the key-pin, and a locking device for the indicator-wheels, adapted to engage the indicator-wheel by a movement outward from the center, substantially as shown and described.

2. The combination, in an indicator-lock, of an indicator-wheel, arranged concentrically about the key-pin and provided with a circular series of inwardly-opening notches, and a locking device for holding the indicator-wheel, which locking device is arranged within the circle of these notches, and is adapted to be operated by the key-bit, substantially as shown and described.

3. In an indicator-lock, an indicator-wheel, arranged concentrically with the key-pin and made with a series of notches, as described, and recessed or thinner in its middle portion, in combination with a ring-shaped slide seated in the recess of the indicator-wheel, and provided with a locking-tooth for engaging the notches of the indicator-wheel, substantially as shown and described.

4. The combination, with a lock, of an annular or ring-shaped slide surrounding the key-pin and having a notch or shoulder on its periphery for arresting the back movement of the key-bit, substantially as shown and described.

5. In an indicator-lock, the combination, with the indicator-wheel, of an actuating mechanism for the progressive forward movement of the said wheel, and a detent adapted to engage with the key-bit to prevent the backward movement of the key, substantially as described.

6. The combination of the indicator-wheel, arranged concentrically with the key-pin, and the annular slide, arranged within the periphery of the indicator-ring, the said slide having a locking connection with the indicator-ring, and also a detent to prevent back movement of the key, substantially as shown and described.

7. The combination, with the hasp and locking-dog, of a vibrating arm, coupled to the locking-dog by a link in such manner that the dog may move independently of the arm, while the latter, when moved by the action of the key upon its cam-face, will necessarily withdraw the locking-dog, substantially as and for the purposes set forth.

8. The combination, with the locking-dog C and pivoted arm D, provided with spring-pawl *f*, of the indicator-wheel G, sliding detent-plate K, and key R, substantially as hereinbefore set forth.

9. The combination, with the indicator-wheel G, provided with a notch, *o*, of spring-lever M, arranged on the plate A, for locking the indicator-wheel, substantially as hereinbefore set forth.

10. The combination, with the indicator-wheel G, locking-lever M, arm D, and detent-plate K, of a through-key, T, for disengaging the lever M and unlocking the lock, as hereinbefore set forth.

EDWARD A. COOPER.

Witnesses:
GEO. A. SWALES,
GEORGE V. COOPER.